Patented Apr. 13, 1954

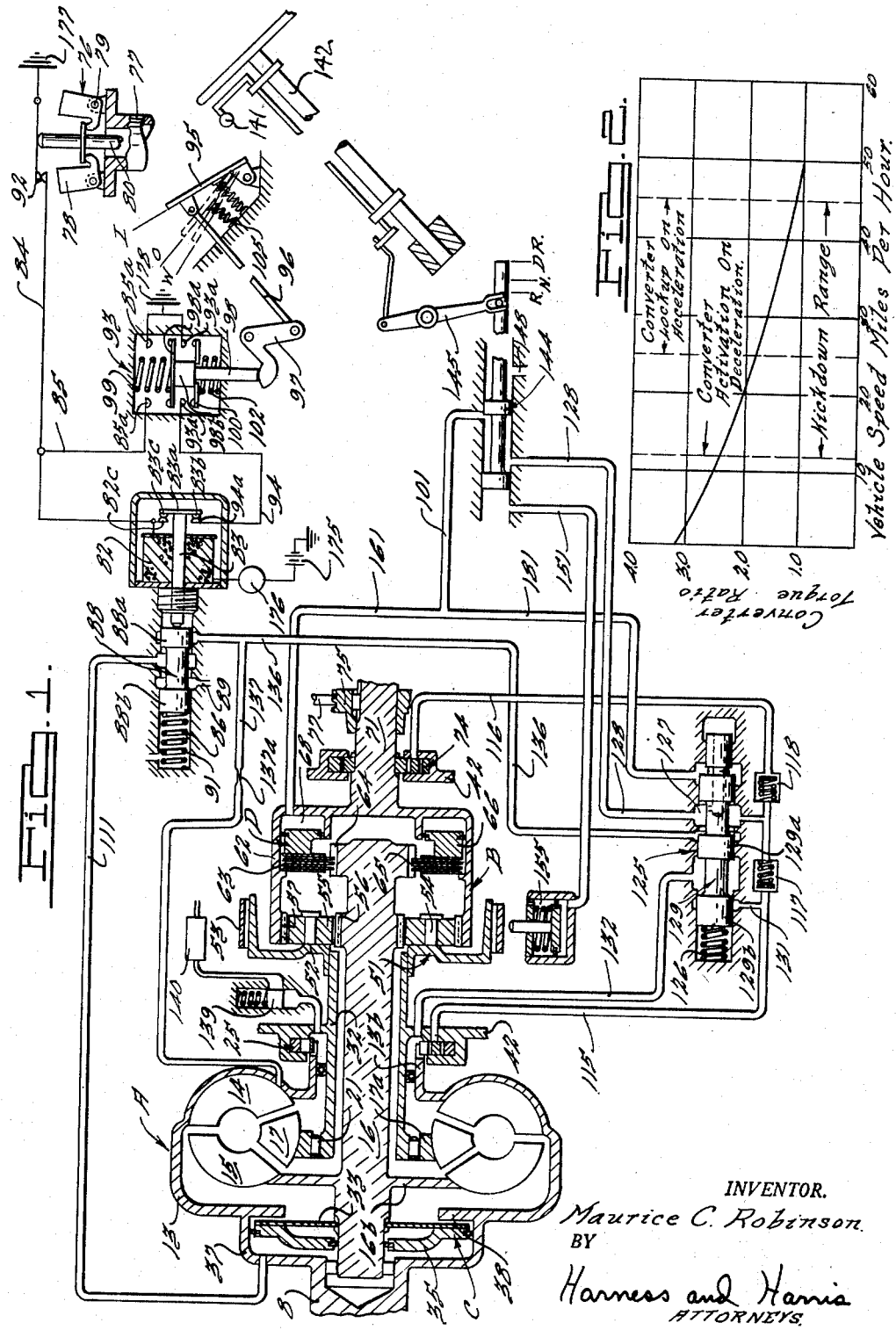

2,675,102

UNITED STATES PATENT OFFICE 2,675,102

TORQUE CONVERTER TRANSMISSION CONTROL

Maurice C. Robinson, Royal Oak, Mich., assignor to Chrysler Corporation, Highland Park, Mich., a corporation of Delaware Application September 21, 1949, Serial No. 116,926

13 Claims. (Cl. 192—.07)

This invention relates to a hydrokinetic power transmitting unit particularly adapted for use in motor vehicle drive, the transmitting unit having associated therewith a simplified form of speed responsive control system.

It is a primary object of this invention to provide a transmission unit comprising a torque converter unit having a relatively high torque multiplying ratio in combination with a simplified form of reverse and direct drive gear unit wherein normally only the higher torque multiplying ratios of the converter unit are used for starting acceleration in the lower speed ranges after which the transmission control system semi-automatically effects a lock-up of the torque converter unit so as to provide a positively connected, cruising, forward, direct drive. The control system also includes means whereby the cruising direct drive may be kicked down by the operator from the direct drive in the higher speed ranges to a torque multiplying, accelerating, drive to provide a high speed accelerating ratio utilizing the lower torque multiplying ratios of the converter unit. This transmission control system also includes means whereby the direct drive may be automatically downshifted to the starting, low speed, high torque multiplying, accelerating ratio at the most advantageous point.

It is an additional object of this invention to provide a transmission unit comprising a hydrokinetic torque converter in combination with a simplified form of gear unit wherein the torque converter is normally used only in its higher torque multiplying ratios where its advantages are most significant and thereafter the torque converter unit is by-passed and a positive, two-way, forward drive provided for the cruising speed range, the lower torque multiplying ratios of the torque converter being reserved for use as a driver activated accelerating ratio for emergency use or high speed acceleration.

It is a further object of this invention to provide an efficient, flexible, simplified form of power transmission unit having a control system that is characterized by simplicity and smoothness of operation during speed ratio changes.

It is another object of this invention to provide a power transmitting unit including a hydrokinetic torque multiplying device wherein speed sensitive controls alone are utilized for effecting the automatic changes in the speed ratio drive transmitted by the power unit, the speed sensitive controls being arranged such that they may be overruled by driver operated controls to provide means for improving the flexibility and overall operating characteristics of the power transmitting unit.

It is still another object of this invention to provide a control system for a power transmission unit including a torque converter and clutch means to positively connect the driving and driven members of the torque converter wherein automatically operated speed sensitive control means attempt to automatically effect engagement and disengagement of the clutch, the automatically operated control means having associated therewith driver operable control means to delay or advance the time of automatic engagement and disengagement of the clutch.

Other objects and advantages of this invention will become readily apparent from a reading of the attached specification and a consideration of the related drawings wherein:

Figure 1 is a diagrammatic view partly in sectional elevation of the power transmission unit and the control system therefor embodying this invention; and Figure 2 is a graph that discloses certain operating characteristics of this power transmission unit, the graph showing the torque multiplying ratios of the converter plotted against vehicle speed.

The invention disclosed herein relates to a modified form of control for the power transmitting unit disclosed in the copending applications of Frederic W. Slack, Serial No. 84,435, filed March 30, 1949, and Serial No. 114,636, filed September 8, 1949.

Figure 1 of the drawings diagrammatically discloses a hydrokinetic torque converter unit A operatively associated with a planetary gear unit B. Converter unit A is adapted to drivingly connect a prime mover such as a motor vehicle engine to a driven member such as the transmission input shaft 16 of the gear type transmission unit B, subsequently described in detail. The reference numeral 8 represents an end portion of a driving member, such as the engine crankshaft of a motor vehicle power unit. The shaft 8 is drivingly connected to the torque converter casing 13 within which are mounted the various converter components, namely, the impeller member 14, the turbine or runner member 15, and the guide wheel or reaction member 17.

The vaned impeller wheel 14 is fixedly connected to the converter casing 13 and is accordingly adapted to be rotatably driven by the driving shaft 8. The vaned turbine wheel 15 is drivingly connected to a radially extending flange portion 16b formed on the intermediate shaft member 16. The intermediate shaft member 16 is adapted to transmit drive from the torque converter unit A to the planetary gear unit B which is arranged in series with the torque converter unit A.

The vaned guide wheel 17 is rotatably supported within the converter casing 13 by means of the guide wheel hub portion 17a that is rotatably mounted, by means of a one-way brake device 21, on an axially extending sleeve 32 that is fixed to and projects from the rearwardly positioned, relatively stationary, gear box housing 42. The one-way brake 21 will permit only forward rotary movement (clockwise when looking from converter A rearwardly towards gear box B) to be transmitted to guide wheel 17 by the forward rotation of the impeller 14, the brake 21 preventing rotation of the guide wheel 17 in a reverse or counterclockwise direction.

The torque converter unit A (see Fig. 1) includes a gear type oil pump 25 that has a driving gear that is directly connected to the axially extending flange portion 13b of the rotatable converter casing 13. The pump 25 draws oil from a sump and circulates it through the converter unit A, the transmission lubricating system and the various hydraulically operated control mechanisms associated with this transmission unit. The circulation of oil through the converter A, by the pump 25, provides a means for maintaining the converter full of oil whenever shaft 8 is rotating. Furthermore, this circulation of the working fluid through the converter and the lubricating and hydraulically operated control systems provides a means for cooling the converter fluid. Separate oil cooler means 140, subsequently described, are also provided. A second pump 74, driven by the transmission output shaft 71, is also included in this transmission to provide a source of pressure fluid when the engine is not operating even though the output shaft is rotating. This pump 74 will be more fully described in connection with the planetary gear box B.

In order to provide means for transmitting a positive, two-way, direct drive from the driving shaft 8 to the intermediate shaft 16 a torque converter lock-up clutch C is provided. The lock-up clutch C includes the radially extending, friction surfaced disc member 33, which member is drivingly connected to the intermediate shaft 16. Cooperatively associated with the disc 33 is a hydraulically operated clutch piston 35 which is slidably mounted on the intermediate shaft 16 for axial shift with respect thereto. Casing 13 is formed with a cylinder 37 in which piston 35 is adapted to reciprocate. Cylinder 37 also supports a backing plate 38 adapted to cooperate with piston 35 to clampingly engage the friction surfaces of the disc member 33 when piston 35 is moved rearwardly as a result of the admission of pressure fluid to piston cylinder bore. Spring means (not shown) and/or the pressure of the fluid on the converter side of the piston 35 normally urge the piston 35 forwardly to a disengaged clutch position. It will be noted that when the clutch piston 35 has been moved rearwardly to clampingly engage the disc member 33 with the backing plate 38 then the torque converter impeller member 14 and the turbine member 15 are locked together and a positive direct drive is transmitted from the driving shaft 8 to the intermediate shaft 16. This direct drive by-passes the torque converter unit A and provides a highly efficient, non-slipping drive that can be used for engine braking during coast drive. The control system associated with the transmission unit is arranged such that the lock-up clutch C may be engaged after the torque multiplying effect of the converter has dropped from its starting drive, high torque multiplication ratio but before the converter unit begins to function as a fluid coupling. By such an arrangement the torque multiplying effects of the converter unit are most advantageously used. With the particular arrangement herein disclosed the torque converter A is designed to have a starting drive torque multiplying ratio of approximately 3 to 1 and the lock-up clutch C is arranged to be semi-automatically engaged when the torque multiplying ratio has dropped to approximately 2 to 1 or less. One of the reasons for effecting a lock-up of the torque converter A by clutch C prior to the time the converter unit begins to function as a simple fluid coupling is to provide a torque multiplying ratio of approximately 2:1 that may be brought into operation by a normal kickdown from the cruising direct drive. This feature is more fully explained in the subsequent description of the operation of this transmission unit.

The gear box B includes the planetary type reverse gearing 51 and the planetary unit direct drive clutch mechanism D. Rotatably mounted on the rear end of the housing sleeve 32 is the hub portion of the reverse gear planet pinion carrier 52. Pinion carrier 52 has a peripheral flange portion adapted to be releasably engaged by a braking band 53. Pinion carrier 52 has pinion pins 54 to rotatably support a plurality of planet pinion gears 55. Fixed to the rearwardly extending end of intermediate shaft 16 is the sun gear 56 of the reverse gearing 51. Sun gear 56 is arranged to meshingly engage the planet pinion gears 55 so as to effect rotation thereof. Also meshingly engaging the planet pinion gears 55 is the annulus gear 57. Annulus gear 57 is drivingly connected to the drum member 62 of the clutch D. Drum 62 is fixedly connected to the output shaft 71.

Direct drive clutch D includes the drum member 62, the driving hub member 64 and the axially shiftable piston member 66. Drum member 62 has drivingly mounted thereon the friction discs 63 which are adapted to be releasably engaged with the friction discs 65 drivingly mounted on the hub member 64. Hub member 64 is drivingly connected to the rear end portion of intermediate shaft 16. The axially shiftable piston 66 is adapted to be moved forwardly to effect engagement of direct drive clutch D as a result of the admission of pressure fluid to the cylinder bore 68 in the cylinder-like drum member 62. Pressure fluid is admitted to the cylinder bore 68 through the conduit 161 which is subsequently described. Spring means (not shown) normally urges the piston member 66 rearwardly to a disengaged clutch position.

It is thought to be obvious that when direct drive clutch D is engaged and the band 53 of the planetary reversing gear mechanism 51 is released, then drive will be transmitted directly from intermediate shaft 16 to output or driven shaft 71 through the engaged clutch members 64, 65, 63, 62. At the times torque converter lock-up clutch C and direct drive clutch D are both engaged then a positive, two-way, direct drive is transmitted from driving shaft 8 through intermediate shaft 16 to driven shaft 71 by a power transmitting train that by-passes the torque converter unit A and the planetary gearing 51. Such a drive is highly efficient for cruising drive for it eliminates the slip that is inherent in a hydrokinetic torque converter unit and it also provides a positively connected power transmitting train that will provide engine braking for coast drive. Clutch D is always engaged before forward drive is transmitted to the driven shaft 71 by the transmission unit and this clutch D remains engaged during all forward drive. As a result of this arrangement whereby there is no engagement or disengagement of clutch D during forward drive, a very smooth drive is obtainable.

Drivingly connected to the output shaft 71 is a second gear type oil pump 74. Oil pump 74 is arranged to draw fluid from a suitable supply sump and circulate it through the hydraulically operated control and lubrication systems of the transmission unit whenever the output shaft 71 is rotating. Consequently, pump 74 provides pressure fluid for operation of the transmission unit during a pushed or towed start even if engine driven pump 25 is inoperative due to a dead engine. Suitable controls, such as the pressure regulator valve 125 may be provided to have pump 74 automatically take over the supply of pressure fluid for the transmission unit whenever the speed of output shaft 71 exceeds a certain predetermined value thereby relieving the front pump 25 of its working load after the engine unit (not shown), has begun to drive the transmission output shaft 71. This arrangement whereby the front pump 25 merely by-passes lubricant during most of the driving time relieves the engine of a material load and improves operating efficiency.

Also drivingly mounted on the output shaft 71 is a drive pinion 75 that transmits drive from shaft 71 to the driven shaft 77 of the speed responsive, centrifugal force operated governor mechanism 76. Governor 76 provides the means for automatically controlling operation of the torque converter lock-up clutch C. Governor 76 is associated with the pressure fluid control valve 88 of the hydraulically operated transmission control system in such a manner that the lock-up clutch C will be automatically operated in a manner to provide highly efficient vehicle performance. The governor mechanism 76 herein disclosed is preferably designed so that on acceleration of the vehicle driven by this power transmission unit the governor will attempt to cause engagement of lock-up clutch C when the vehicle has attained a road speed of approximately twenty-five miles per hour. However, on deceleration of the vehicle the governor will not effect disengagement of clutch C until the vehicle road speed has dropped to approximately twelve miles per hour. By providing a governor that disengages clutch C on deceleration at a relatively low road speed, compared to its point of activation on acceleration, it is possible to maintain the transmission unit in its cruising direct drive ratio during the major portion of its cruising drive and the automatic shifts between direct cruising drive and the torque converter transmitted accelerating drive are maintained at a minimum. This tends to improve operating efficiency and to give smoother performance.

The hydraulically operated transmission control system shown includes the conduits 115 and 116 which connect the pumps 25 and 74 respectively with a pressure regulator valve 125. Spring 126 of pressure regulator valve 125 determines the pressure that is to be maintained in the pressure fluid supply conduit 128. A pump output pressure of approximately 90 pounds per square inch has been found to be satisfactory for operation of this transmission control system. However, the actual pressures of the fluid delivered to supply conduits 128 and 136 may be varied by the control of pressure fluid admitted to conduit 131. As this pressure control feature relates to operation of the pressure regulator valve 125 which element does not form a part of this invention, additional description of the valve 125 will be omitted. The pump output conduits 115 and 116 each include check valves 117 and 118 to insure a suitable pressure head in the pumps at all times. With the control arrangement shown the pump 25 supplies the fluid pressure for starting drive under ordinary conditions and as the speed of output shaft 71 increases the pump 74 automatically takes over and feeds the supply conduit 128. As pump 74 comes into operation the pressure fluid supplied therefrom is transmitted to chamber 127 of pressure regulator valve 125 and this pressure acts on land 129a of piston valve 129 and moves piston valve 129 towards the left compressing spring 126. Movement of piston valve 129 to the left displaces the valve land 129b so as to connect conduit 131 to by-pass conduit 132 thereby providing a means for by-passing the output of the pump 25. Upon the operation of either pump 25 or 74 the fluid pressure in chamber 127 is always sufficient to move plunger valve 129 slightly to the left to connect chamber 127 with conduit 136 which supplies pressure fluid for the operation of the torque converter unit A and the lock-up clutch C.

The pressure fluid supply conduit 136 connects the chamber 127 of the regulator valve 125 to the cylinder 86 that contains the control valve 88. The control valve 88 is slidably mounted within the valve cylinder bore 86 so that it may be reciprocated as a result of energization and deenergization of the solenoid 82. Solenoid 82 has a reciprocable plunger bar 83 that shifts towards the left and actuates valve 88 on energization of the solenoid 82. Energization of solenoid 82 moves valve 88 to the left to the position shown in Figure 1 where the valve land 88a of the valve 88 will block off the supply of pressure fluid to conduit 111 from the supply conduit 136. Accordingly, when solenoid 82 is energized pressure fluid cannot reach the torque converter lock-up clutch C so the drive from shaft 8 to shaft 16 will be a torque multiplying drive through the converter A. When valve 88 is positioned as shown in Figure 1, then the pressure fluid in clutch C can drain back to a supply sump through the drain port 89. On deenergization of the solenoid 82 the valve return spring 91 shifts the valve 88 to the right to a position where supply conduit 136 is connected through the valve cylinder 86 to the conduit 111 and pressure fluid is then directed into the lock-up clutch C to effect engagement of the clutch. At this time valve land 88b will block off drain 89 and maintain the pressurized condition of the pressure fluid in the clutch C. It will be noted that during all operation of the transmission pressure fluid is directed into the torque converter A from supply conduit 136 through the branch conduit 137. Conduit 137 has a restriction passage 137a to control the volume of the fluid admitted to the converter A and a suitable pressure relief valve 139 is associated with the discharge side of the converter A to maintain the proper pressure within the converter A. Pressure fluid within the converter A is maintained at a sufficiently low pressure so that it will not materially interfere with the operation of the clutch C. For clutch engagement the pressure of the fluid admitted to clutch C may be 90 pounds per square inch whereas the pressure of the fluid in the converter A may be only 45 pounds per square inch. A suitable pressure fluid cooling means such as the cooler 140 is associated with the discharge side of the converter. Pressure fluid from cooler 140 may be directed into the transmission lubrication system prior to its return to the supply sump for the pressure fluid system.

The control system for the operation of the solenoid 82 and control valve 88 includes a pair of solenoid energizing circuits and a solenoid de-energizing circuit, all three circuits being arranged in parallel.

The first circuit for controlling energization of solenoid 82 and operation of control valve 88 includes an automatically operated switch 92. Automatically operated switch 92 is arranged to be operated by the speed sensitive governor mechanism 76 which is preferably drivingly connected to the transmission output shaft 71 through the rotatable governor shaft 77 that meshingly engages the pinion 75 fixed to the output shaft 71. Rotatable governor shaft 77 carries a pair of pivotally mounted weights 78 that are adapted to swing radially outwardly about their pivot centers 79 as the speed of shaft 77 increases. After a predetermined outward movement of weights 78 the fingers on the inner sides of the weights 78 engage the collar on shaft 80 and raise the shaft 80 to a position that causes switch 92 to open and this breaks one of the electrical circuits for controlling the operation of the solenoid 82. Obviously when switch 92 is open then the circuit from the grounded battery 175 through the ignition switch 176, solenoid 82, conductor 84, and switch 92 to ground at 177 is no longer effective to maintain solenoid 82 energized.

The second circuit for controlling energization of solenoid 82 includes a manually operated switch, which is meant to include either a hand or foot operated switch, such as the switch unit 93, which switch unit is arranged in parallel with the automatically operated switch 92 so that it can modify the operation of switch 92 and provide a means for the driver to overrule the automatic operation of solenoid 82 by the switch 92. Switch unit 93 has a contact 93a thereof connected by conductor 94 to a switch contact 94a associated with solenoid 82. Contact 94a is adapted to be engaged by a switch contact 83b carried by the solenoid bar conductor element 83a whenever solenoid 82 is energized. Conductor element 83a of the solenoid plunger bar 83 also includes a contact 83c that is adapted to be engaged with the contact 82c of the solenoid coil whenever solenoid 82 is energized. Conductor 84 connecting solenoid 82 and switch 92 has a branch conductor 85 connected to ground at 178 through a pair of switch contacts 85a. Contacts 85a are adapted to be connected together by a conductor element 98a carried by a manually operable plunger member 98. Plunger member 98 is arranged to be actuated by means of the accelerator pedal 95 that controls the torque delivered to the transmission driving shaft 8. Accelerator pedal 95 is connected by linkage 96 to a pivotally mounted bell crank lever 97. Lever 97 has a cam formation on the end of one of its arms that engages an end of the plunger 98 to transmit motion thereto. Spring 99 normally urges conductor element 98a downwardly to break the connection between contacts 85a. When the accelerator pedal is in the closed throttle or idle position indicated by the letter I then the spring 99 urges plunger 98 downwardly to the position shown in Fig. 1 where the connection between contacts 85a is broken. In this position the shoulder 98b on plunger 98 engages the spring supported conductor element 100 and moves it downwardly so as to break the connection between contacts 93a. Accordingly at the closed throttle or idle position I of the accelerator pedal 95 the solenoid 82 can not be grounded at 178 through either of the conductors 85 or 94 for both sets of contacts 85a and 93a are open. However, at closed throttle the speed of shaft 71 will normally be such as to cause the governor controlled contacts 92 to be closed so a closed circuit to ground at 177 is always available to energize the solenoid 82 and initiate drive through the torque converter A. Upon movement of the accelerator pedal 95 from its closed throttle position I to its wide open throttle position W there is provided a second circuit for effecting energization of solenoid 82 for then a circuit in parallel with the first energizing circuit is provided from battery 175 through switch 176, solenoid 82, conductor 85 and closed switch contacts 85a to ground at 178. This second circuit will permit energization of solenoid 82 regardless of the condition of the governor operated switch 92 for it is in parallel with the first energizing circuit containing the switch 92. Consequently a so-called manually or driver effected energization of solenoid 82 may be accomplished at any vehicle speed. This permits a kick-down from direct drive to an accelerating drive through the converter unit A at any speed as will be more clearly pointed out in the subsequent description of the operation of this transmission unit.

The circuit for controlling de-energization of the solenoid 82 is arranged in parallel with and is adapted to cooperate with the automatically operated first solenoid energizing circuit through the switch 92. This solenoid de-energizing circuit comprises the battery 175, switch 176, solenoid 82, contacts 82c, 94a, the solenoid actuated contact connecting element 83a, conductor 94, contacts 93a, the accelerator pedal actuated contact connecting element 100 and the ground connection at 178. The operation of the solenoid de-energizing circuit is also fully explained in the subsequent description of the operation of this transmission unit.

The manual controls for this transmission unit include the drive selector lever 141 which is usually rotatably mounted on the conventional vehicle steering column 142. Control lever 141 is connected to manually operated piston type control valve 144 by the linkage arrangement 145. Drive selector lever 141 has three positions, a centrally located neutral position, between the terminally located forward drive position and the reverse drive position. The three positions are denoted by the letters N, DR and R respectively.

*Operation*

When the transmission driving engine is operating and drive selector lever 141 is in the neutral position then manual control valve 144 is positioned so that supply conduit 128 cannot direct pressure fluid into either the forward direct drive conduit 101 or the reverse drive control conduit 151. Accordingly, neither direct clutch D nor reverse band 53 are in engaged condition and consequently neither a forward nor a reverse drive is transmitted to the output shaft 71. The front pump 25 at this time will merely circulate fluid through the converter A and the lubrication system. The torque converter lock-up clutch C will be disengaged at this time for the ignition system has energized the solenoid 82 due to the governor 76 causing contacts 92 to be closed at all vehicle speeds under approximately twelve miles per hour. With solenoid 82 energized the control valve 88 is shifted towards the left to the position shown and consequently pressure fluid from conduit 136 cannot enter the conduit 111 nor the clutch C.

If the drive selector lever 141 is moved to the forward drive position (as shown in Fig. 1) then pressure fluid from supply conduit 128 passes through the manually operated control valve assembly 144 into conduit 101 from which the pressure fluid will be directed into the conduit 161 so as to engage direct drive clutch D and condition gear box B for the transmission of a forward direct drive. The engine speed at closed throttle with the valve 144 in its forward drive position will be such that slip in the torque converter unit A and drag of the associated drive train elements will prevent an actual forward drive being transmitted to the driven shaft 71 even though the direct clutch D is engaged. Subsequently, as the accelerator pedal 95 is depressed to increase the speed of the driving engine unit (not shown), the torque converter impeller 14 will be rotated at such a speed that a torque multiplying drive will be transmitted to the converter turbine 15 and the associated driven shaft 16. Shaft 16, being directly connected to output shaft 71 by the direct drive clutch D, thus initiates drive of shaft 71 at a torque multiplying ratio which is particularly adapted for vehicle acceleration. Accordingly, during initial forward acceleration the relatively high torque multiplication ratio of the converter unit A is effective and a torque multiplying accelerating drive of approximately 3 to 1 is transmitted by the converter unit A to the output shaft 71. This drive is from driving shaft 8 through torque converter A to turbine driven shaft 16 and then through engaged direct clutch D to output shaft 71.

Subsequently, as the accelerator pedal 95 is depressed from idle position I towards open position O, the speed of output shaft 71 increases and the speed responsive governor 76 will operate so as to condition the control system for the engagement of the torque converter lock-up clutch C which will convert the accelerating, relatively high torque multiplying, starting drive into a two-way, positive, direct drive. At a predetermined speed of output shaft 71, approximately twenty-five miles per hour vehicle speed, the governor 76 will open switch 92 and break the solenoid energizing circuit that is grounded at 177. However, opening of switch 92 will not automatically de-energize the solenoid 82 and effect the engagement of lock-up clutch C for on depression of accelerator pedal 95 the plunger bar 98 is raised and this raises the shoulder 98b of bar 98 off the conductor member 100 and permits spring 102 to urge conductor 100 against contacts 93a of switch 93. Closing of switch contacts 93a by conductor 100 provides a closed solenoid energizing circuit to ground at 178 which circuit is in parallel with the opened circuit through switch 92. Therefore solenoid 82 will remain energized after switch 92 opens as long as contacts 93a are closed. Contacts 93a will remain closed until the accelerator pedal is released to the closed throttle or idle position I. On release of the accelerator pedal 95 to its closed throttle position the plunger bar shoulder 98b will depress conductor 100 and open contacts 93a to break the solenoid energizing circuit through contacts 93a that is grounded at 178. This de-energizes the solenoid 82 and control valve 88 then shifts to the right to admit pressure fluid to the clutch C and convert the torque multiplying drive through converter A into a positive two-way direct drive. Subsequent depression of the accelerator to any position between I and O, the normal cruising speed ranges, will not re-energize the solenoid 82 for the conductor 83a has been shifted to the right by spring 91 so that contacts 92c and 94a are open and consequently neither ground at 177 or 178 is available to complete the energizing circuit for solenoid 82. The converter lock-up clutch C will thus normally remain engaged until the speed of the vehicle drops to approximately 12 miles per hour at which time the governor 76 will close switch 92 and energize the solenoid 82 so as to automatically disengage the clutch C and re-establish the torque multiplying drive through the converter A. From the above it is thought to be obvious that a control system has been provided in which the conversion from the accelerating torque multiplying drive to the positive direct drive may be delayed at the will of the vehicle operator until the most favorable time for such a change is reached. This control system is a combination of an automatic speed responsive shift with a manually operable shift delaying arrangement to provide a most flexible control system wherein the vehicle operator may condition the transmission to meet the specific road, load and traffic conditions encountered.

In normal operation of the vehicle the accelerator pedal 95 is moved between the closed throttle or idle position I and the open throttle position O which is preferably 5 or 10 degrees less than the fully opened or wide open throttle position W of the pedal 95. During this normal arc of operation of the accelerator pedal 95 the plunger bar mounted conductor 98a will not engage the contacts 85a so the kickdown to a converter transmitted drive will not occur by a normal depression of pedal 95. To prevent accidental or unintended depression of the accelerator pedal 95 to the wide open throttle position W a pick-up spring 105 is associated with pedal 95 so as to require additional effort on the part of the operator to depress the pedal 95 to the position W whereby a kickdown of the locked-up converter clutch C will occur. Spring 105 is not engaged by the pedal 95 until after the pedal has been depressed to the nearly wide open throttle position O.

If, while travelling in the two-way, locked-up, direct drive, a high speed accelerating drive is desired then a kickdown to a more favorable accelerating ratio may be manually effected by merely depressing the accelerator pedal 95 a predetermined amount, such as to the limit of its downward or throttle opening movement as indicated by the letter W, and this will effect a closing of switch contacts 85a by conductor 98a and thereby provide a closed circuit to ground at 178 to energize the solenoid 82 and cause a shift of control valve 88 to the left so as to disengage the torque converter lock-up clutch C and bring the torque converter unit A back into operation. When conductor 98a closes contacts 85a a circuit from solenoid 82 through conductors 84, 85, 85a to ground at 178 is provided which circuit is independent of the position of the solenoid plunger bar conductor 83 therefore the fact that solenoid 82 is de-energized prior to the kick down is immaterial. From Fig. 2 it will be noted that when the vehicle speed is above the speed at which lock-up of the converter unit A normally occurs, still, there is a considerable torque-multiplication ratio available for high speed accelerating use so it is possible to overrule the automatically operated speed responsive governor 76 and to manually kickdown from the cruising direct drive to a torque multiplying drive through the converter unit A at any time up to approximately forty miles per hour vehicle speed. At cruising speeds of twenty to forty miles per hour a kicked-down accelerating ratio of between 2 and 1.2 to 1 is available for high speed accelerating drive. The kicked down accelerating ratio may be maintained for as long as the vehicle operator decides the torque multiplying drive is necessary by merely keeping the accelerator pedal 95 depressed to position W. On release of the pedal 95 the lock-up clutch C will be re-engaged and the two-way direct drive re-established provided the vehicle speed is above 25 miles an hour or whatever speed the governor 76 is set to open the contacts 92.

Reverse drive may be obtained by moving the drive selector lever 141 to the reverse position. This positions the manually operated control valve 144 in such a position that pressure fluid from supply conduit 128 is directed into the reverse band control conduit 151 while forward drive control conduit 101 is blocked off from supply conduit 128. Conduit 101 at this time is opened to the drain 148 in valve 144 to drain the pressure fluid from the direct drive clutch D. Admission of pressure fluid to conduit 151 actuates the reverse band piston 155 and applies reverse braking band 53 so that the planetary gearing 51 will transmit a reverse drive from input shaft 8 through the torque converter A and turbine driven shaft 16 to the planetary gearing 51 and then to output shaft 71. Planetary gearing 51 is effective to produce a reverse drive for application of brake band 53 anchors the planet pinion carrier 52 while driving sun gear 56 rotates the annulus gear 57 in a reverse direction. Annulus gear 57 is directly connected to output shaft 71, thus a reverse drive is transmittable through the torque converter unit A to the driven or output shaft 71.

I claim:

1. In a motor vehicle including an engine having an accelerator pedal and a transmission drivingly connected to said engine having driving and driven shafts, a hydrodynamic torque converter connectible between said shafts to transmit a torque multiplying drive therebetween, and a clutch associated with said converter adapted to be engaged to provide means for transmitting a positive direct drive between said shafts and to be disengaged to provide means for the transmission of a torque multiplying drive between said shafts through said converter; automatically operated control means responsive only to the speed of the driven shaft to condition the control system for said clutch for a driver effected clutch engagement after said driven shaft has accelerated to a predetermined rotative speed and to automatically effect disengagement of said clutch after the speed of said driven shaft has decelerated to a speed less than said predetermined rotative speed, and a first driver operable control means for said clutch adapted to be actuated on release of said accelerator pedal to provide a means to effect the engagement of said clutch after said driven shaft accelerates to said predetermined rotative speed and a second driver operable control actuated by movement of said accelerator pedal to provide a means for effecting disengagement of said clutch prior to time said automatically operated control means would effect such disengagement, said first driver operable control means thereby providing a means cooperable with the automatically operated control means to control and vary the period of the torque multiplying drive and said second driver operable control means providing a means to overrule the automatically operated clutch disengaging control means and providing a driver operated means for controlling the period of transmission of the positive direct drive.

2. In a motor vehicle including an engine with an accelerator pedal and a transmission driven by said engine having driving and driven shafts, a hydrodynamic torque converter having a torque multiplying ratio of approximately 3 to 1 connectible between said shafts to transmit a torque multiplying drive therebetween, and a clutch associated with said converter adapted to be engaged to provide means for transmitting a positive direct drive between said shafts and to be disengaged to provide means for the transmission of a torque multiplying drive between said shafts through said converter; automatically operated control means responsive only to the speed of the driven shaft to condition the control system for said clutch for a driver effected clutch engagement after said driven shaft has accelerated to a predetermined rotative speed and to automatically effect disengagement of said clutch when the speed of said driven shaft has decelerated to a speed less than said predetermined rotative speed, and a first driver operable control means for said clutch adapted to be actuated by release of said accelerator pedal to engine idle position to provide a means to effect the engagement of said clutch after said driven shaft accelerates to said predetermined rotative speed and a second driver operable control means actuated by depression of said accelerator pedal to provide a means for effecting disengagement of said clutch prior to time said automatically operated control means would effect such disengagement, said first driver operable means thereby providing a means cooperable with the automatically operated control means to control the period of the torque multiplying drive and said second driver operable means providing a means independent of said automatically operated control means to provide a driver operated means for controlling the period of transmission of the positive direct drive, said automatically operated control means including a pressure fluid supply system having conduit means arranged to direct pressure fluid into said converter and into an operator for said clutch, a speed responsive governor operably associated with said driven shaft, valve means operably associated with said governor and adapted to be automatically actuated by valve operator mechanism operably associated with said governor, said valve means forming a part of the pressure fluid supply system and controlling admission and release of pressure fluid to said clutch fluid pressure operator to thereby effect engagement and disengagement of said clutch, said second driver operable control means including means operable by said accelerator pedal to actuate said valve means whereby the driver may effect disengagement of said clutch prior to the time said governor would automatically effect disengagement of the clutch.

3. In a motor vehicle including an engine having an accelerator pedal and a transmission drivingly connected to said engine having driving and driven shafts, a hydrodynamic torque converter connectible between said shafts to transmit a torque multiplying drive therebetween, and a clutch associated with said converter adapted to be engaged to provide means for transmitting a positive direct drive between said shafts and to be disengaged to provide means for the transmission of a torque multiplying drive between said shafts through said converter; automatically operated control means responsive only to the speed of the driven shaft to condition the control system for said clutch for a driver effected clutch engagement after said driven shaft has accelerated to a predetermined rotative speed and to automatically effect disengagement of said clutch when the speed of said driven shaft has decelerated to a speed less than said predetermined rotative speed, and a first driver operable control means for said clutch adapted to be actuated by release of said accelerator pedal to provide a means to effect the engagement of said clutch after said driven shaft accelerates to said predetermined rotative speed and a second driver operable control means actuated by depression of said accelerator pedal to provide a means for effecting disengagement of said clutch prior to time said automatically operated control means would effect such disengagement, said first driver operable means thereby providing a means cooperable with the automatically operated control means to control the period of the torque multiplying drive and also a means independent of said automatically operated control means to provide a driver operated means for controlling the period of transmission of the positive direct drive, said automatically operated control means including a pressure fluid supply system having conduit means arranged to direct pressure fluid into said converter and into an operator for said clutch, a speed responsive governor operably associated with said driven shaft, a solenoid operably associated with said governor so as to have the energization thereof controlled by said governor, valve means operably associated with said solenoid for actuation thereby, said valve means forming a part of the pressure fluid supply system and controlling admission and release of pressure fluid to said clutch fluid pressure operator to thereby effect engagement and disengagement thereof respectively, said second driver operable control means including means operable by said accelerator pedal to independently effect the deenergization of said solenoid and the actuation of said valve means for effecting disengagement of said clutch and means actuable by said first driver operable means and cooperable with said automatically operated control means to conjointly effect de-energization of said solenoid and actuation of said valve means for effecting engagement of said clutch.

4. In a motor vehicle including an engine having an accelerator pedal and a transmission drivingly connected to said engine having driving and driven shafts, a hydrodynamic torque converter connectible between said shafts to transmit a torque multiplying drive therebetween, and a clutch associated with said converter adapted to be engaged to provide means for transmitting a positive direct drive between said shafts and to be disengaged to provide means for the transmission of a torque multiplying drive between said shafts through said converter; automatically operated control means responsive only to the speed of the driven shaft to condition the control system for said clutch for a driver effected clutch engagement after said driven shaft has accelerated to a predetermined rotative speed and to automatically effect disengagement of said clutch when the speed of said driven shaft has decelerated to a speed less than said predetermined rotative speed, and a first driver operable control means for said clutch adapted to be actuated by release of said accelerator pedal to provide a means to effect the engagement of said clutch after said driven shaft accelerates to said predetermined rotative speed and a second driver operable control means actuated by depression of said accelerator pedal to provide a means for effecting disengagement of said clutch prior to time said automatically operated control means would effect such disengagement, said first driver operable means thereby providing a means cooperable with the automatically operated control means to control the period of the torque multiplying drive and said second driver operable means providing a means independent of said automatically operated control means to provide a driver operated means for controlling the period of transmission of the positive direct drive, said automatically operated control means comprising a source of pressure fluid connected by conduit means to said clutch, the conduit means including a cylinder and a valve movably mounted therein, said valve being adapted to be actuated to control the admission to and release of pressure fluid to an operator for said clutch to thereby control engagement and disengagement of said clutch, a speed responsive governor operably associated with said driven shaft, a solenoid operably connected to said solenoid so as to have the energization thereof automatically controlled by said governor and the de-energization thereof controlled conjointly by said governor and the first driver operable control means, the second driver operable control means independently providing a means for the driver to control the energization of said solenoid.

5. In a motor vehicle including an accelerator pedal and a transmission having driving and driven shafts, a hydrodynamic torque converter connectible between said shafts to transmit a torque multiplying drive therebetween, and a clutch and controls therefor associated with said converter, said clutch being adapted to be engaged to provide means for transmitting a positive direct drive between said shafts and to be disengaged to provide means for the transmission of a torque multiplying drive between said shafts through said converter; said clutch controls comprising a pressure fluid system for effecting engagement and disengagement of said clutch, a valve associated with said pressure fluid system and arranged such that actuation thereof controls engagement and disengagement of said clutch, a solenoid unit operably associated with said valve in such a manner that energization and de-energization of said solenoid unit actuates said valve, and an electrical control system for effecting energization and de-energization of said solenoid unit comprising first and second solenoid energizing circuits arranged in parallel, said first energizing circuit including a first switch and a governor mechanism responsive to the speed of said driven shaft for automatically opening and closing said first switch, said second solenoid energizing circuit including a second switch and a means operable by said accelerator pedal to provide for the manual opening and closing of said second switch, and a solenoid deenergization circuit comprising said first solenoid energizing circuit and a third circuit arranged in parallel with said first solenoid energizing circuit comprising a third switch arranged to be automatically closed during energization of said solenoid and opened during de-energization of said solenoid, and a fourth switch in series with said third switch, said fourth switch being arranged to be manually closed during throttle opening movement of said accelerator pedal and to be opened on release of said accelerator pedal to closed throttle position.

6. In a motor vehicle including an accelerator pedal and a transmission having driving and driven shafts, a hydrodynamic torque converter connectible between said shafts to transmit a torque multiplying drive therebetween, and a clutch and controls therefor associated with said converter, said clutch being adapted to be engaged to provide means for transmitting a positive direct drive between said shafts and to be disengaged to provide means for the transmission of a torque multiplying drive between said shafts through said converter; said clutch controls comprising a pressure fluid system for effecting engagement and disengagement of said clutch, a valve associated with said pressure fluid system and arranged such that actuation thereof controls engagement and disengagement of said clutch, a solenoid unit operably associated with said valve in such a manner that energization and de-energization of said solenoid unit actuates said valve, and an electrical control system for effecting energization and de-energization of said solenoid unit comprising a first and a second solenoid energizing circuit, said circuits being arranged in parallel and each including a switch adapted to be closed to effect energization of said solenoid unit, said first solenoid energizing circuit having a governor mechanism responsive to the speed of the driven shaft to automatically close the switch in said first solenoid energizing circuit at driven shaft speed below a predetermined speed and to automatically open the switch in the first solenoid energizing circuit after said driven shaft attains said predetermined speed, said second solenoid energizing circuit including a first accelerator pedal operated switch adapted to be closed by a predetermined amount of throttle opening movement of said accelerator pedal and to be opened when the accelerator pedal is in throttle closing position, and a circuit for controlling de-energization of said solenoid unit comprising a solenoid operated switch that is automatically closed upon energization of said solenoid and opened upon de-energization of said solenoid and a second accelerator pedal operated switch in series with said solenoid operated switch, said second accelerator pedal operated switch being arranged such that release of said accelerator pedal to a throttle closing position opens said second accelerator operated switch while a predetermined movement of said accelerator pedal in a throttle opening direction closes said second accelerator pedal operated switch.

7. In a control system for a motor vehicle having an accelerator pedal controlled engine and a transmission adapted to be driven by said engine, said transmission having coaxially arranged driving, intermediate and driven shafts, a hydrokinetic torque converter having a torque multiplication ratio of approximately 3 to 1 for transmitting multiplied torque from the driving to the intermediate shaft, a torque converter clutch for directly connecting the driving and intermediate shafts, a direct drive clutch for directly connecting the intermediate and driven shafts, manually operated means to control engagement of said direct drive clutch, automatically operated, vehicle speed responsive, control means to automatically condition said torque converter clutch for engagement and accelerator pedal controlled means to thereafter effect torque converter clutch engagement at the will of the vehicle operator, said automatically operated control means being arranged to automatically cause disengagement of said torque converter clutch when the speed of said vehicle is decelerated below a predetermined value, said accelerator pedal operated means being operable to effect engagement of said torque converter clutch after the speed of said vehicle has been accelerated to said predetermined value and while the torque converter is operating in the higher ratios of its torque multiplication range, and a second accelerator pedal operated torque converter clutch control means cooperatively associated with said automatically operated vehicle speed responsive clutch control means adapted to be operated to provide a means to overrule said automatically operated vehicle speed responsive control means and to provide a second means to effect disengagement of said torque converter clutch, said second means being effective prior to the time said automatically operated vehicle speed responsive control means would automatically effect clutch disengagement, said second accelerator pedal operated control means thereby providing means for the transmission of a torque multiplying drive utilizing the lower ratios of the torque multiplication range of the torque converter.

8. In a control system for a motor vehicle having an engine and a driver operable control for said engine, and a transmission adapted to be driven by said engine, said transmission having coaxially arranged driving, intermediate and driven shafts, a hydrokinetic torque converter having a torque multiplication ratio of approximately 3 to 1 for transmitting multiplied torque from the driving to the intermediate shaft, a torque converter clutch for directly connecting the driving and intermediate shafts, a direct drive clutch for directly connecting the intermediate and driven shafts, manually operated control means to control engagement of said direct drive clutch, automatically operated control means responsive to the speed of the driven shaft arranged to provide a means for conditioning said torque converter clutch for engagement after the speed of said driven shaft is accelerated to a predetermined value, and to automatically effect disengagement of said torque converter clutch when the speed of said driven shaft decelerates below a predetermined value, a first control actuable by said driver operable engine control to effect engagement of the converter clutch after the driven shaft speed has been accelerated to said predetermined value and while the torque converter is operating in the higher ratios of its torque multiplication range, and a second control actuable by said driver operable engine control means and cooperatively associated with said automatically operated control means for disengaging said converter clutch providing means to overrule said automatically operated control means and effect disengagement of said torque converter clutch prior to the time said automatically operated control means would effect such disengagement to thereby provide means for the transmission of a torque multiplying drive utilizing the lower ratios of the torque multiplication range of the torque converter.

9. In a motor vehicle including an engine with an accelerator pedal and a transmission driven by said engine having driving and driven shafts, a hydrodynamic torque converter having a torque multiplication ratio of better than 2.5 to 1 connectible between said shafts to transmit a torque multiplying drive therebetween, and a clutch associated with said converter adapted to be engaged to provide means for transmitting a positive direct drive between said shafts and to be disengaged to provide means for the transmission of a torque multiplying drive between said shafts through said converter; automatically operated control means responsive to the speed of the driven shaft to condition the control system for said clutch for a driver effected clutch engagement after said driven shaft has been accelerated to a predetermined rotative speed, and to automatically effect disengagement of said clutch when the speed of said driven shaft has decelerated to a speed less than said predetermined rotative speed, a first driver operable control means for said clutch adapted to be actuated by release of said accelerator pedal to a predetermined limiting position to provide a means to effect the engagement of said clutch after said driven shaft has been accelerated to the predetermined rotative speed and a second driver operable control means actuated by depression of said accelerator pedal to a predetermined limiting position to provide a means for manually effecting disengagement of said clutch prior to time said automatically operated control means would effect such disengagement, said first driver operable means thereby providing a means cooperable with the automatically operated control means to control the period of the torque multiplying drive utilizing the higher torque multiplying ratios of the converter and said second driver operable means providing a means independent of said automatically operated control means to provide a driver operated means for controlling the period of transmission of the positive direct drive and the utilization of the lower torque multiplying ratios of the converter.

10. In a motor vehicle including an engine with an accelerator pedal and a transmission drivingly connected to said engine having driving and driven shafts, a hydrodynamic torque converter connectible between said shafts to transmit a torque multiplying drive therebetween, and a clutch and controls therefor associated with said converter, said clutch being adapted to be engaged to provide means for transmitting a positive direct drive between said shafts and to be disengaged to provide means for the transmission of a torque multiplying drive between said shafts through said converter; said clutch controls comprising a clutch operator and an electrically operated system for actuating said clutch operator and effecting engagement and disengagement of said clutch, said system having a solenoid unit operably associated with said clutch operator in such a manner that energization and de-energization of said solenoid unit disengages and engages said clutch, and an electrical control system for effecting energization and de-energization of said solenoid unit comprising first and second solenoid energizing circuits arranged in parallel, said first energizing circuit including a first switch and a governor mechanism responsive to the speed of said driven shaft for automatically opening and closing said first switch, said second solenoid energizing circuit including a second switch and a means operable by said accelerator pedal to provide for driver effected opening and closing of said second switch, and a solenoid de-energization circuit comprising said first solenoid energizing circuit and a third circuit arranged in parallel with said first solenoid energizing circuit comprising a third switch arranged to be automatically closed during energization of said solenoid and opened during de-energization of said solenoid, and a fourth switch in series with said third switch, said fourth switch being arranged to be closed during throttle opening movement of said accelerator pedal and to be opened on release of said accelerator pedal to closed or idle throttle position.

11. In a motor vehicle including an engine with an accelerator pedal and a transmission drivingly connected to said engine having driving and driven shafts, a hydrodynamic torque converter connectible between said shafts to transmit a torque multiplying drive therebetween, and a clutch and controls therefor associated with said converter, said clutch being adapted to be engaged to provide means for transmitting a positive direct drive between said shafts and to be disengaged to provide means for the transmission of a torque multiplying drive between said shafts through said converter; said clutch controls comprising a clutch operator and an electrically operated system for actuating said clutch operator and effecting engagement and disengagement of said clutch, said system having a solenoid unit operably associated with said clutch operator in such a manner that energization and de-energization of said solenoid unit disengages and engages said clutch, and an electrical control system for effecting energization and de-energization of said solenoid unit comprising a first and a second solenoid energizing circuit, said circuits being arranged in parallel and each including a switch adapted to be closed to effect energization of said solenoid unit, said first solenoid energizing circuit having a governor mechanism responsive to the speed of the driven shaft to automatically close the switch in said first solenoid energizing circuit at driven shaft speed below a predetermined speed and to automatically open the switch in the first solenoid energizing circuit after said driven shaft attains said predetermined speed, said second solenoid energizing circuit including a first accelerator operated switch adapted to be closed by a predetermined movement of said accelerator pedal from the closed throttle position towards the open throttle position and to be opened when the accelerator pedal is released to throttle closing position, and a circuit for controlling de-energization of said solenoid unit comprising a solenoid operated switch that is automatically closed upon energization of said solenoid and opened upon de-energization of said solenoid and a second accelerator operated switch in series with said solenoid operated switch, said second accelerator operated switch being arranged such that release of said accelerator pedal to a throttle closing position opens said accelerator operated switch while a predetermined movement of said acceleraor pedal in a throttle opening direction closes said second switch.

12. In a motor vehicle including an engine controlled by an accelerator pedal and a transmission having driving and driven shafts, said driving shaft being connected to said engine, a hydrodynamic torque converter connectible between said shafts to transmit a torque multiplying drive therebetween, and a clutch and controls therefor associated with said converter, said clutch being adapted to be engaged to provide means for transmitting a positive direct drive between said shafts and to be disengaged to provide means for the transmission of a torque multiplying drive between said shafts through said converter; said clutch controls comprising mechanically operated means for effecting engagement and disengagement of said clutch and electrically operated means for controlling operation of said mechanically operated means, said electrically operated means having a control circuit comprising a first energizing circuit including means responsive to the speed of said driven shaft to automatically effect disengagement of said clutch when the driven shaft speed decelerates to a predetermined speed, a second energizing circuit for said electrically operated means arranged in parallel with said first energizing circuit and including accelerator pedal operated means to effect activation of said electrically operated means to cause disengagement of said clutch at the will of the vehicle operator, and a third circuit arranged in parallel with said first circuit to control the engagement of said clutch comprising driven shaft speed responsive means to automatically condition said clutch controls for clutch engagement when said driven shaft has been accelerated to a predetermined speed and accelerator pedal operated means to delay the clutch engaging action at the will of the vehicle operator.

13. In a motor vehicle including an engine with an accelerator pedal and a transmission driven by said engine having driving and driven shafts, a hydrodynamic torque converter connectible between said shafts to transmit a torque multiplying drive therebetween, and a clutch and controls therefor associated with said converter, said clutch being adapted to be engaged to provide means for transmitting a positive direct drive between said shafts and to be disengaged to provide means for the transmission of a torque multiplying drive between said shafts through said converter; said clutch controls comprising mechanically operated means for effecting engagement and disengagement of said clutch and electrically operated means for controlling operation of said mechanically operated means, said electrically operated means having a control circuit comprising a first energizing circuit including means responsive to the speed of said driven shaft to effect activation of said electrically operated means to automatically cause disengagement of the clutch when the driven shaft speed decelerates to a predetermined speed, a second energizing circuit for said electrically operated means arranged in parallel with said first energizing circuit and including accelerator pedal actuable means to effect activation of said electrically operated means to cause disengagement of said clutch at the will of the vehicle operator, and a third circuit arranged in parallel with said first circuit to control the activation of said electrically operated means to effect engagement of said clutch comprising driven shaft speed responsive means to automatically condition said clutch controls for clutch engagement when said driven shaft has been accelerated to a predetermined speed and accelerator pedal actuable means operable upon movement of said pedal to a predetermined position to delay the engagement of said clutch at the will of the vehicle operator.

References Cited in the file of this patent

UNITED STATES PATENTS

| Number | Name | Date |
| --- | --- | --- |
| 2,332,593 | Nutt | Oct. 26, 1943 |
| 2,368,684 | Simpson | Feb. 6, 1945 |
| 2,380,677 | Schjolin | July 31, 1945 |
| 2,397,634 | Voytech | Apr. 2, 1946 |
| 2,407,289 | La Brie | Sept. 10, 1946 |
| 2,449,586 | Carnagua | Sept. 21, 1948 |
| 2,454,614 | Peterson | Nov. 23, 1948 |
| 2,487,606 | Smith | Nov. 8, 1949 |
| 2,495,515 | Foley | Jan. 24, 1950 |
| 2,555,702 | Railton | June 5, 1951 |